United States Patent
Vinnen et al.

(10) Patent No.: US 7,165,434 B2
(45) Date of Patent: Jan. 23, 2007

(54) HOT FORMING TOOL

(75) Inventors: Martin Vinnen, Leopoldshöhe (DE); Robert Stockter, Hannover (DE); Hans Jürgen Knaup, Bad Lippspringe (DE)

(73) Assignee: Benteler Maschinenbau GmbH, Bielefeld (DE)

( * ) Notice: Subject to any disclaimer, the term of this patent is extended or adjusted under 35 U.S.C. 154(b) by 0 days.

(21) Appl. No.: 11/226,416

(22) Filed: Sep. 15, 2005

(65) Prior Publication Data
US 2006/0059971 A1 Mar. 23, 2006

(30) Foreign Application Priority Data
Sep. 17, 2004 (DE) ...................... 10 2004 045 155

(51) Int. Cl.
*B21D 37/16* (2006.01)
(52) U.S. Cl. ...................... 72/342.3; 72/463; 76/107.1
(58) Field of Classification Search ............... 72/342.1, 72/342.3, 342.7, 462, 463, 476; 76/107.1
See application file for complete search history.

(56) References Cited
U.S. PATENT DOCUMENTS

| | | | | |
|---|---|---|---|---|
| 3,668,917 A | * | 6/1972 | Komatsu et al. ........... 72/342.3 |
| 4,356,717 A | * | 11/1982 | Okunishi et al. .......... 72/342.3 |
| 5,398,572 A | * | 3/1995 | Hashimoto et al. ........ 76/107.1 |
| 6,185,978 B1 | * | 2/2001 | Sundgren et al. ............. 72/364 |
| 6,415,640 B1 | * | 7/2002 | Haussermann ............... 72/350 |

\* cited by examiner

*Primary Examiner*—Ed Tolan
(74) *Attorney, Agent, or Firm*—Barnes & Thronburg LLP

(57) ABSTRACT

The object of the invention is a hot-forming tool (1) having an upper die and a lower die (1a, 1b), the upper as well as the lower die (1a, 1b) each consisting of a base plate (2) having a forming cheek (3) fixed thereto and a core (4) which is also fixed to the base plate (2), and a duct system (5) for the guiding-through of a coolant being constructed between the core (4) and the backside of the forming cheek (3) facing the core (4).

In this case, at least the forming cheeks (3) are constructed as cast parts.

As a result of this manufacturing method relating to the forming cheeks (2) (3? translator), the manufacturing costs of the hot-forming tool (1) can be significantly lowered because a high-expenditure mechanical cutting machining of the forming cheeks is only still required in the area of the mounting surfaces (3a) as well as the mutually facing exterior sides (3b).

13 Claims, 1 Drawing Sheet

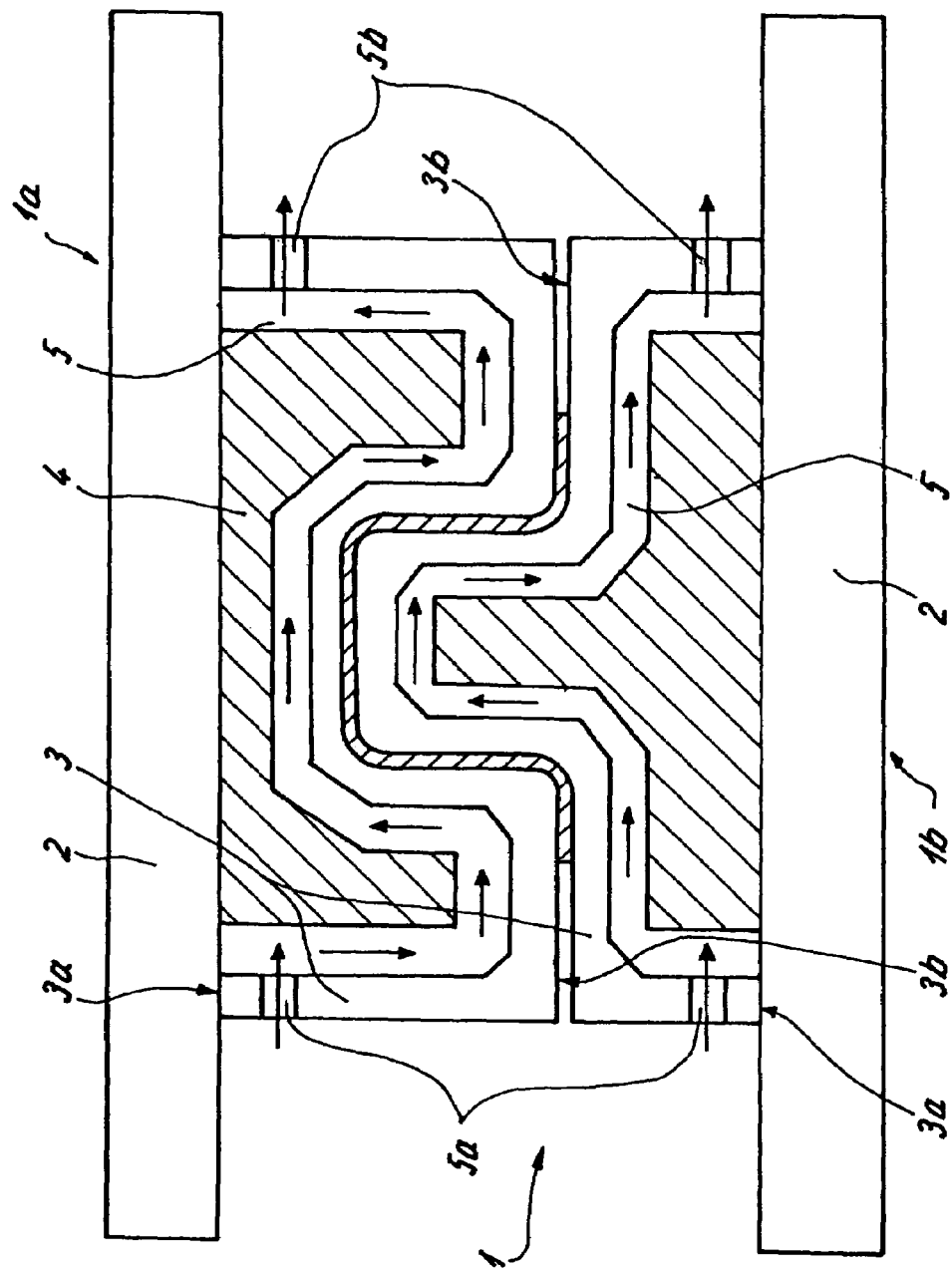

HOT FORMING TOOL

CROSS-REFERENCE

This non-provisional application claims priority to and benefit from German Patent Application No. 10 2004 045 155.9-14, filed in Germany on Sep. 17, 2004, the disclosure of which is hereby incorporated by reference herein.

BACKGROUND AND SUMMARY

The present disclosure relates to a hot-forming tool having an upper die and a lower die. The upper as well as the lower die each include a base plate having a forming cheek fixed thereto and a core which is also fixed to the base plate. Also included is a duct system for the guiding-through of a coolant, the duct system being constructed between the core and the backside of the forming cheek facing the core.

Generally, a hot-forming tool of the above-mentioned type is known.

However, in the case of the known hot-forming tools, the forming cheeks have exclusively been produced mechanically.

Until now, the following working steps were required for producing the forming cheeks:
1. 6-sided basic machining of a formed part used as a blank;
2. Rough milling of the form contour and making of fastening holes for fixing the finished forming cheek on a base plate;
3. Making of the cooling duct system by milling and/or deep-hole drilling;
4. Heat treatment (hardening);
5. Grinding to the end measurement;
6. Eroding; and
7. HSC milling of the outer contour.

This type of production of forming cheeks is very time-consuming and cost-intensive because of a high proportion of cutting machining.

The present disclosure provides for a cast hot-forming tool whose manufacturing costs are significantly lower in comparison to previously produced hot-forming tools.

According to the present disclosure, at least the forming cheeks are constructed as cast parts.

As a result of the manufacturing of the forming cheeks as cast parts, the required mechanical (cutting) machining of the forming cheeks is reduced to the machining of the mounting surfaces, or the bearing surfaces on the base plates and the HSC milling of the outer contour after the heat treatment.

The manufacturing costs for the hot-forming tool of the present disclosure can therefore be reduced considerably without having to accept disadvantages or impairments with respect to the cooling system.

Other aspects of the present disclosure will become apparent from the following descriptions when considered in conjunction with the accompanying drawings.

BRIEF DESCRIPTION OF THE DRAWINGS

The drawing FIGURE is a schematic sectional view of a cast hot-forming tool with a duct system for the guiding-through of a coolant, according to the principles of the present disclosure.

DETAILED DESCRIPTION

In the FIGURE, a cast hot-forming tool as a whole has the reference number 1 and comprises an upper die 1a as well as a lower die 1b.

The upper die 1a as well as the lower die 1b each include a base plate 2, a forming cheek 3 fixed thereto and a core 4 which is also fixed to the base plate 2.

Between the core 4 and a backside of the respective forming cheek 3 facing the core 4, a duct system 5 is constructed for the guiding-through of a coolant, for example, for the guiding-through of cooling water.

The coolant can flow into the duct system 5 through an inlet 5a and can flow out from the duct system 5 by way of an outlet 5b.

The forming cheeks 3 of the hot-forming tool 1 are constructed as cast parts, so that a contour of the forming cheeks 3 for forming the duct system 5 is constructed by casting and any mechanical cutting machining may no longer be required for this purpose.

A cutting or machining of the forming cheeks 3 may be required only in an area of mounting surfaces 3a as well as of mutually opposite exterior surfaces 3b of the forming cheeks 3.

In principle, the respective cores 4 can also be constructed as cast parts but, if required, may also be machined by cutting, which may be advantageous in the latter case if the cores 4 include a material, such as aluminum, which is easy to machine mechanically.

The forming cheeks 3 may include high-strength tool steel.

As a result of the construction of the forming cheeks 3 as cast parts, the manufacturing costs for a hot-forming tool 1 are lowered considerably because a significant part of the cutting machining is no longer necessary for their production. This relates particularly to the contouring of the forming cheeks 3 in the area of the duct systems 5.

Although the present disclosure has been described and illustrated in detail, it is to be clearly understood that this is done by way of illustration and example only and is not to be taken by way of limitation. The scope of the present disclosure is to be limited only by the terms of the appended claims.

We claim:
1. A hot-forming tool, comprising:
   an upper die and a lower die, each die including a base plate having a forming cheek fixed to the base plate;
   a core fixed to each base plate;
   a duct system constructed between each core and a backside of the forming cheek, the duct system configured to guide a coolant there through; and
   wherein at least the forming checks are constucted as cast parts.
2. The hot-forming tool according to claim 1, wherein the cores each include a metal capable of being machined mechanically.
3. The hot-forming tool according to claim 1, wherein the forming cheeks include high-strength tool steel.
4. The hot-forming tool according to claim 1, wherein the forming cheeks include mutually facing exterior surfaces, the exterior surfaces being one or more of the following: a) mechanically machined, and b) machined by eroding.
5. The hot-forming tool according to claim 1, wherein the forming cheeks include at least one inlet leading into the duct system and at least one outlet leading out of the duct system.

6. The hot-forming tool of claim 2, wherein the metal is aluminum.

7. In a hot forming tool having an upper and a lower die, each die including a base plate having a core and a forming cheek, a method of producing the hot-forming tool comprising:
- casting the forming cheeks to include at least one inlet and at least one outlet;
- mounting each of the cores to a respective base plate; and
- mounting each forming cheek adjacent a respective core so as to form a duct system between each core and a backside of the forming cheeks, the duct system extending between the at least one inlet and the at least one outlet.

8. The method of claim 7, wherein the casting step includes the use of aluminum to cast the forming cheeks.

9. The method of claim 7, wherein the casting step includes the use of high-strength tool steel to cast the forming cheeks.

10. The method of claim 7, further including the step of casting the forming cheeks to include mutually facing exterior surfaces.

11. The method of claim 10, further including the step of mechanically machining the mutually facing exterior surfaces of the forming cheeks.

12. The method of claim 10, further including the step of machining the mutually facing exterior surfaces of the forming cheeks by eroding.

13. The method of claim 7, further including the step of mechanically machining the cores.

* * * * *